Nov. 30, 1937.  A. W. NELSON  2,100,567

KNOB ATTACHING MEANS

Filed May 18, 1936

Inventor:
Andrew W. Nelson,
By: Zabel, Carlson & Wells
Attorney

Patented Nov. 30, 1937

2,100,567

UNITED STATES PATENT OFFICE 2,100,567

KNOB ATTACHING MEANS

Andrew W. Nelson, Terre Haute, Ind., assignor to Columbian Enameling & Stamping Co., Inc., Terre Haute, Ind., a corporation of Indiana Application May 18, 1936, Serial No. 80,380

2 Claims. (Cl. 16—121)

This invention relates to handles for the covers of vessels such as cooking vessels and is particularly directed to a novel means of mounting a knob handle upon a cover. The invention is particularly adapted to enameled ware.

It is the principal purpose of this invention to provide a device of this character wherein the attachment of the knob handle to an enameled cover may be accomplished in such a fashion as to rigidly secure the knob in place without damaging the enamel.

In the manufacture of kitchen utensils, it is common practice to mount knob handles by passing mounting screws through the cover on which the knob handle is to be mounted and by clamping the knob handle to the cover by screwing the handle down upon the screw. Various ways of having the screw and the knob handle to avoid damage to the cover have been devised. Such devices, however, do not lend themselves readily to providing a cover that is fully protected by the enamel. The head of the screw or other securing device is always exposed within the receptacle and the clamping tends to injure the enamel in any case.

The present invention contemplates a handle mounting whereby the under surface of the cover is completely devoid of any breaks in its surface so that the enamel presents an unbroken protective coating.

The invention further contemplates the provision of a mounting for handles wherein the knob may be screwed onto the cover tightly without subjecting the metal in the cover to such a strain or bending stress as to crack the enamel.

I will describe the preferred form of the invention by reference to the accompanying drawing wherein—

Figure 1:
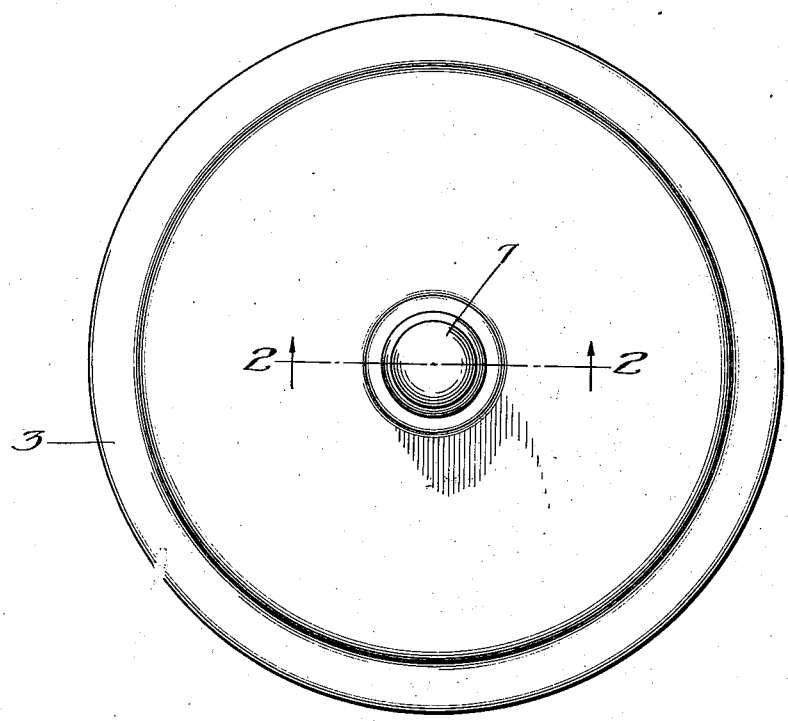
Fig. 1 is a plan view of a cover embodying the invention.
Figure 2:
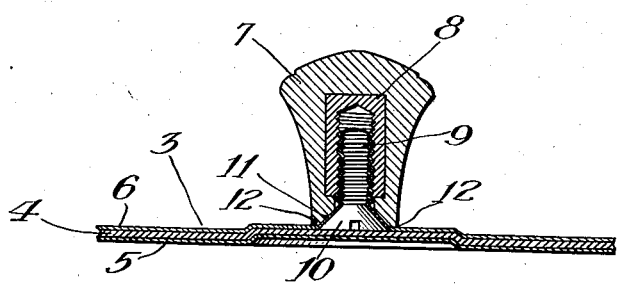
Fig. 2 is a sectional view on the line 2—2 of Fig. 1.

Referring now in detail to the drawing, I show a cover 3 for a cooking utensil which cover is composed of a metal sheet 4 shaped for its desired purpose and coated over its entire exterior by upper and lower coatings 5 and 6 of porcelain enamel. The cover is provided with a knob handle 7 which may be of any suitable shape, and this handle encloses a screw threaded block 8 which is adapted to receive a screw 9 for drawing the knob 7 down upon the cover 3.

The manner of connecting the screw 9 to the sheet metal 4 is of prime importance in the present device. Before enameling the metal cover, I directly weld a screw threaded member 9 to the top of the metal cover. This screw threaded member I provide with a head 10 which is enlarged and bevelled so as to be substantially conical in shape. It so happens that an ordinary screw adapted to be used in a countersunk opening is applicable for the present invention. After welding the head 10 firmly onto the metal cover, the entire cover including the member 9 and its head 10 is given one coating of enamel. A second coating is applied also, but this coating is restricted to the cover itself and is not applied to the screw 9 since it is not necessary. The knob 7 is bevelled as indicated at 11 so as to fit down upon the bevel head 10 of the member 9, and, outside of the bevelled portion 11, the knob 7 has a flat rim portion 12 adapted to engage the thick double coat of enamel 6 on the top of the cover.

Now in tightening the knob on the cover, it will be noted that the flat portion 12 is the only part of the knob which bears directly upon the cover itself. Owing to inaccuracies in the manufacture, there may be no direct bearing of the bevelled portion of the knob against the bevelled portion 10 of the screw. However, even in this extreme condition, there is not sufficient bending stress communicated to the metal cover 4 to damage the enamel because of the fact that the head 10 is directly welded to the metal and the force against the metal of the portion 12 is of a necessity applied very close to this head. It, therefore, cannot get enough leverage to provide a sufficient bending stress to damage the enamel.

From the above description, it is believed that the construction and advantages of this device will be clear to those skilled in this art.

Having thus described one specific form of the invention, what I claim as new and desire to secure by Letters Patent is:

1. A knob mounting for securing knobs upon sheet metal members comprising a sheet metal member, a screw having a bevelled head welded to the surface of the member, and a knob having a screw threaded opening for said screw, said opening being bevelled at its mouth to receive the head of the screw.

2. A knob mounting for securing knobs upon sheet metal members comprising a sheet metal member, a screw having a bevelled head welded to the surface of the member, and a knob having a screw threaded opening for said screw, said opening being bevelled at its mouth to receive the head of the screw, the surface of said member having a plurality of coats of enamel thereon and said screw having one coating of enamel thereon.

ANDREW W. NELSON.